United States Patent Office 3,260,706
Patented July 12, 1966

3,260,706
ALKALI-SOLUBLE POLYMERIC CARBOXY ESTER LACTONES
Louis M. Minsk and Edward P. Abel, Rochester, N.Y., assignors to Eastman Kodak Company, Rochester, N.Y., a corporation of New Jersey
No Drawing. Filed Aug. 26, 1963, Ser. No. 304,676
7 Claims. (Cl. 260—78.5)

This invention relates to a method of preparing alkali-soluble polymeric carboxy ester lactones involving reacting upon a low viscosity starting material with a reaction mixture having a high water content.

The interpolymers prepared by polymerizing a mixture of an unsaturated alpha-beta-dicarboxylic acid or anhydride with a vinyl organic ester are well known. Thus polymerization of a mixture of maleic anhydride and vinyl acetate yields an interpolymer which can be represented graphically as follows:

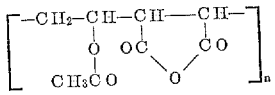

Interpolymers of alpha-beta-dicarboxylic acids or anhydrides and vinyl esters have been modified by reaction with a monohydric alcohol and an acid catalyst whereby they were deacylated and lactonized and simultaneously the carboxyl was esterified with a monohydric alcohol. The resulting lactone esters are insoluble in water and without hydrolysis treatment are insoluble in alkali. These compounds and their preparation have been described in McNally and Van Dyke U.S. Patent No. 2,216,071.

For some applications such as developer removable backings or stripping layers for photographic film, it is desirable to have highly flexible materials which are water insoluble but which will dissolve in aqueous alkaline solutions particularly in weak bases on the order of dilute aqueous solutions of sodium bicarbonate. A method of preparing such materials in a homogenous procedure has been disclosed in U.S. Patent No. 3,007,901 of Minsk which procedure is characterized by the use of monohydric hydroxy acid.

One object of our invention is to provide a method of making carboxy lactone polymers which exhibit solubility in dilute alkali suitable for alkali removable coatings particularly for photographic products. Another object of our invention is to provide a method for modifying the physical and chemical characteristics of interpolymers of unsaturated alpha-beta-dicarboxylic acids or their anhydrides and vinyl organic acid esters in which the use of a monohydric hydroxy acid is avoided without impairing the excellent solubility of the product. Other objects of our invention will appear herein.

We have found that products having good alkali solubility are obtained by modifying heteropolymers of an anhydride of an unsaturated alpha-beta-dicarboxylic acid and a vinyl organic acid ester, having an inherent viscosity of no more than 0.30, with a reaction mixture composed of water, monohydric alcohol and an acid catalyst in which the water is present in a molar ratio of at least 1.8:1 to the monohydric alcohol or without any alcohol present. By the modification of the lower viscosity heteropolymers in this manner, products are obtained having good and useful properties for the application of alkali soluble coatings to photographic products which coatings are readily removable by alkaline solutions including those weakly alkaline such as photographic developers or the like.

In preparing products in accordance with our invention we employ as the starting material a heteropolymer of an unsaturated alpha-beta-dicarboxylic acid or its anhydride and a vinyl organic acid ester which has an inherent viscosity measured in acetone at a concentration of 0.25 gram per 100 ml. of solution of not more than 0.30. The alpha-beta-dicarboxylic acid or anhydride may be maleic, itaconic, citraconic, dimethylmaleic or the like. The vinyl organic acid ester may be the vinyl ester of any commonly used organic acid such as vinyl acetate, vinyl propionate, vinyl benzoate or the like.

Products prepared from intermediates with an inherent viscosity greater than 0.30 invariably show anomolous viscosity behavior either as the free acid or as the sodium salt due to cross-linking occurring during the reaction. If a viscosity high enough is used, the degree of cross-linking reaches a level sufficiently high to make the product useless.

In its broadest aspects our invention involves reacting upon a heteropolymer, as described, with a reaction mixture comprising a substantial amount of water and with or without added monohydric alcohol under the influence of an acid catalyst which reaction introduces sufficient carboxyl groups into the interpolymer to provide a carboxyl content of from 12% up to theoretical (40.8%) calculated as maleic acid depending upon the amount of alcohol added and the water to alcohol ratio. The ratio in moles of water to monohydric alcohol in the reaction mixture should be at least 1.8:1, and preferably at least 5:1. In some cases no monohydric alcohol is used. The reaction should be carried out in a reaction mixture in which the liquid is at least 3 times the amount of heteropolymer used. Where no monohydric alcohol is used a considerable proportion of water is used such as at least 5 parts of water per part of heteropolymer by weight.

To promote the reaction it is desirable that the mixture be maintained at an elevated temperature such as that provided by a steam bath for a considerable time. Alternately, an enclosed vessel or autoclave may be employed if desired. By providing a molar proportion of water greatly in excess of the molar proportion of alcohol, a considerable content of carboxy groups is introduced into the heteropolymer to obtain a product having sufficient carboxyl content to assure alkali solubility.

The products obtained in accordance with our invention are lactones of resinous heteropolymers of vinyl alcohol and unsaturated alpha-beta-dicarboxylic acids, optimally but not necessarily partially esterified by a monohydric alcohol. They are readily soluble and hence are adapted in the form of their solutions in organic solvents for use for supplying coatings such as backings or the like to photographic products which coatings because of their solubility in aqueous alkaline solutions such as developers are readily removable upon processing of the photographic film or other products coated therewith.

Because of their excellent solubility, our products may be readily converted to their sodium salts by the methods given in pending U.S. application Serial No. 145,435 now Patent Number 3,169,946 (Minsk) to yield smooth readily flowable solutions.

The following example illustrates the preparation of a heteropolymer of maleic anhydride and vinyl acetate having an inherent viscosity measured in acetone at a concentration of 0.25 gram per 100 ml. of no more than 0.30.

*Example*

In a 12 liter flask equipped with a reflux condenser and stirrer the following materials were placed: 860 grams of vinyl acetate, 980 grams of maleic anhydride, 5520 ml. of acetone, 27.6 grams of benzoyl peroxide. The mass was heated at 65° C. overnight (16–18 hours) and the dope obtained was diluted with acetone to precipitation viscosity and the mass was precipitated in 20–25 gallons of agitated distilled water. The vinyl acetate-maleic anhydride heteropolymer thus obtained was separated from the liquid, water washed several times, centrifuged and dried. The heteropolymer thus obtained had an inherent viscosity of 0.23. Other well known interpolymers of vinyl organic acid esters and unsaturated alpha-beta-dicarboxylic acids can be prepared in similar manner for use as starting materials for processes in accordance with our invention.

The following examples illustrate our invention.

*Example 1*

Into a 2 liter flask equipped with reflux condenser and stirrer were placed 200 grams of vinyl acetate-maleic anhydride interpolymer (inherent viscosity 0.29) 600 ml. of distilled water and 70 ml. of n-butyl alcohol. The mixture was gently stirred for 1–2 hours and a clear solution was obtained. 68 ml. of concentrated sulfuric acid was then added dropwise and the mass was heated on a steam bath for 1½ hours. The formation of solid material was noted. The heating was continued for 18 hours. The solid which formed was separated from the liquid and was kneaded in a Werner-Pfleiderer mill in repeated changes of water to reduce acidity and to harden and break up the polymer.

After the carboxy ester lactone thus obtained was completely freed of acid it was dried in a 40° oven overnight to obtain a yield of 150 grams. Titration indicated carboxyl equivalent to 5.18 ml. of normal NaOH per gram, or a carboxyl content in terms of maleic acid of 30%. This preparation and the product are designated as Number 3 in the accompanying table. Other preparations were carried out in like manner varying the molar ratio of water to butyl alcohol as indicated. The proportions used and the results obtained were as follows:

| | Intermediate | | Water (ml.) | n-Butyl Alcohol (ml.) | Molar Ratio of Water/ Alcohol | Analysis | |
|---|---|---|---|---|---|---|---|
| | (G.) | Inherent Viscosity | | | | 1 N NaOH (ml./g.) | Percent Carboxyl as Maleic Acid |
| 1 | 200 | 0.29 | 600 | 40 | 76/1 | 5.93 | 34.4 |
| 2 | 200 | 0.29 | 600 | 60 | 51/1 | 5.28 | 30.6 |
| 3 | 200 | 0.29 | 600 | 70 | 43.5/1 | 5.18 | 30.0 |
| 4 | 200 | 0.29 | 600 | 75 | 40/1 | 5.14 | 29.8 |
| 5 | 200 | 0.25 | 600 | 80 | 38/1 | 4.80 | 27.8 |
| 6 | 200 | 0.25 | 600 | 100 | 30.6/1 | 4.70 | 27.2 |
| 7 | 200 | 0.21 | 600 | 300 | 10.4/1 | 3.52 | 20.4 |
| 8 | 200 | 0.23 | 600 | 600 | 5.1/1 | 3.10 | 18.0 |

*Example 2*

A mixture of 200 grams of vinyl acetate-maleic anhydride heteropolymer (inherent viscosity 0.13), 460 ml. of water and 500 ml. of normal propyl alcohol was placed in a 2 liter flask equipped with reflux condenser and stirrer and was stirred until a smooth dope was obtained. There was then added dropwise 70 ml. of centrated sulfuric acid. The mass was stirred and he on a steam bath overnight during which time a soft solid separated out. After cooling, the supernatant li was decanted and the solid was dissolved in 2 liter acetone. The clear, yellow dope thus obtained poured into agitated distilled water to obtain a granular product. The polymer was washed with peated changes of distilled water until free from min acid. The product was dried in an air oven at 35° giving 407 grams of propyl ester lactone soluble in di base. Direct titration in 1:1 acetone-water (200 ml.) with N/2 NaOH to a phenolphthalein endpoint indic carboxyl equilavent to 3.15 ml. normal NaOH/g. is equivalent to a carboxyl content, in terms of ma acid, of 18.2%.

In the following table the above procedure correspo to Number 12. Other preparations were carried ou like manner but using the proportions indicated in table as follows:

| | Intermediate | | Water (ml.) | n-Butyl Alcohol (ml.) | Molar Ratio of Water/ Alcohol | Analysis | |
|---|---|---|---|---|---|---|---|
| | (G.) | Inherent Viscosity | | | | 1 N NaOH (ml./g.) | Percent Carboxyl as Maleic Ac |
| 11 | 200 | 0.11 | 580 | 290 | 8.3/1 | 3.50 | 2 |
| 12 | 200 | 0.13 | 460 | 500 | 3.8/1 | 3.15 | 1 |
| 13 | 200 | 0.13 | 360 | 600 | 2.5/1 | 2.60 | 1 |
| 14 | 200 | 0.13 | 300 | 680 | 1.8/1 | 2.40 | 1. |

The products of the various examples were employ as backings for photographic film. The coatings we found to have good adherence and to be removable whe the film was processed in alkaline developer solution

*Example 3*

Example 2 was repeated except that benzyl alcohol wa employed as the monohydric alcohol, the proportion used being 200 grams of heteropolymer (inherent vi cosity of 0.29), 600 ml. of water and 85 ml. of benzy alcohol giving a molar ratio of water to benzyl alcoho of 41:1. Titration of the benzyl ester lactone obtaine indicated a carboxyl equivalent to 5.46 ml. normal NaOF per gram, equivalent to a carboxyl content, calculated a maleic acid, of 31.7%.

*Example 4*

Five hundred grams of vinyl acetate-maleic anhydride heteropolymer (inherent viscosity 0.12) was placed in a 5 liter flask together with 2500 ml. of distilled water. After stirring to form a suspension of the polymer in water there was added dropwise 70 ml. of concentrated ic acid. The mixture was heated on a steam bath ight. After cooling, the solid material formed was ated, washed free from mineral acid and dried. tion of the lactone obtained indicated carboxyl alent to 6.6 ml. of normal NaOH per gram or in s of maleic acid the carboxyl content was 38.3%. is example was repeated using different proportions inherent viscosities. The proportions and viscosities and the results obtained compared with theoretical oxyl are given in the following table, the procedures ribed in Example 4 being that designated as Number 1 the table.

| Intermediate | | Water (ml.) | Analysis | |
|---|---|---|---|---|
| (G.) | Inherent Viscosity | | 1 N NaOH (ml./g.) | Percent Carboxyl as Maleic Acid |
| 500 | 0.11 | 2,500 | 6.6 | 38.3 |
| 300 | 0.25 | 2,700 | 6.72 | 39.0 |
| 150 | 0.23 | 1,350 | 6.81 | 39.5 |
| | | | *7.04 | *40.8 |

*Theoretical.

Ve claim:
1. A method of preparing alkali soluble polymeric carboxy ester lactones which comprises reacting one part a soluble interpolymer of a compound selected from group consisitng of the unsaturated alpha-beta-dicarxylic acids and anhydrides and a vinyl organic ester ving an inherent viscosity in acetone at a concentration 0.25 gram per 100 ml. of solution of not more than 0 with at least 5 parts of a liquid free of monohydroxy d composed of one molar proportion of water and 0.59 molar proportions of a lower monohydric alcohol gether with a mineral acid catalyst having a strength the order of sulfuric acid at above room temperature itil lactonization of the polymer has occurred.

2. A method of making alkali soluble polymeric caroxy ester lactones which comprises reacting one part a soluble interpolymer of a compound selected from e group consisitng of the unsaturated alpha-beta-dicaroxylic acids and anhydrides and a vinyl organic ester hich has an inherent viscosity in acetone at a concenation of 0.25 gram per 100 ml. of solution of not more an 0.30 with at least 5 parts of a liquid free of monoydroxy acid composed of water and alcohol in which he water is present in a molar ratio of at least 1.8:1 ogether with a mineral acid catalyst having a strength n the order of sulfuric acid at above room temperature o a point at which the polymer has been lactonized.

3. A method of preparing alkali soluble polymeric caroxy ester lactones which comprises reacting one part of maleic anhydride-vinyl acetate interpolymer having in inherent viscosity in acetone at a concentration of 0.25 gram per 100 ml. of solution of not more than 0.30 with at least 5 parts of a liquid free of monohydroxy acid composed of one molar proportion of water and 0–0.59 molar proportions of a lower monohydric alcohol with a mineral acid catalyst having a strength on the order of sulfuric acid at above room temperature to a point at which the vinyl acetate-maleic anhydride has been lactonized.

4. A method of preparing alkali soluble polymeric carboxy ester lactones which comprises reacting 200 parts by weight of vinyl acetate-maleic anhydride interpolymer having an inherent viscosity in acetone at a concentration of 0.25 gram per 100 ml. of solution of not more than 0.30 with a liquid free of monohydroxy acid composed of 600 parts by volume of water and 70 parts by volume of normal butyl alcohol with sulfuric acid catalyst at above room temperature to a point at which the polymer has been lactonized.

5. A method of preparing alkali soluble polymeric carboxy ester lactones which comprises reacting 200 parts by weight of a vinyl acetate-maleic anhydride heteropolymer having an inherent viscosity in acetone at a concentration of 0.25 gram per 100 ml. of solution of not more than 0.30 with a liquid free of monohydroxy acid composed of 460 parts by volume of water and 500 parts by volume of normal propyl alcohol with sulfuric acid catalyst at above room temperature to a point at which the polymer has been lactonized.

6. A method of preparing alkali soluble polymeric carboxy ester lactones which comprises reacting 200 parts by weight of a vinyl acetate-maleic anhydride heteropolymer having an inherent viscosity in acetone at a concentration of 0.25 gram per 100 ml. of solution of not more than 0.30 with a liquid free of monohydroxy acid composed of 600 parts by volume of water and 85 parts by volume of benzyl alcohol with sulfuric acid catalyst at above room temperature to a point at which the polymer has been lactonized.

7. A method of preparing alkali soluble polymeric carboxy ester lactones which comprises reacting one part of a vinyl acetate-maleic anhydride heteropolymer having an inherent viscosity in acetone at a concentration of 0.25 gram per 100 ml. of solution of not more than 0.30 with a liquid free of monohydroxy acid essentially consisting of water and sulfuric acid catalyst at above room temperature to a point at which the polymer has been lactonized.

References Cited by the Examiner
UNITED STATES PATENTS
2,306,071   12/1942   McNally _____ 260—78.5

JOSEPH L. SCHOFER, *Primary Examiner.*

L. WOLF, *Assistant Examiner.*